US012573656B2

(12) United States Patent

Schuhmacher et al.

(10) Patent No.: US 12,573,656 B2
(45) Date of Patent: Mar. 10, 2026

(54) SINTERING AID MIXTURE, SOLID-STATE ION CONDUCTOR, AND METHOD FOR PRODUCING SOLID-STATE ION CONDUCTORS

(71) Applicant: SCHOTT AG, Mainz (DE)

(72) Inventors: Jörg Schuhmacher, Kornwestheim (DE); Miriam Kunze, Seelze (DE); Hans-Joachim Schmitt, Ockenheim (DE); Philipp Treis, St. Aldegund (DE); Meike Schneider, Taunusstein (DE); Andreas Roters, Mainz (DE); Jochen Drewke, Bechtolsheim (DE)

(73) Assignee: SCHOTT AG, Mainz (DE)

( * ) Notice: Subject to any disclaimer, the term of this patent is extended or adjusted under 35 U.S.C. 154(b) by 161 days.

(21) Appl. No.: 17/391,094

(22) Filed: Aug. 2, 2021

(65) Prior Publication Data

US 2022/0037694 A1     Feb. 3, 2022

(30) Foreign Application Priority Data

Jul. 31, 2020     (DE) ..................... 10 2020 209 708.9

(51) Int. Cl.
| | |
|---|---|
| *H01M 10/0562* | (2010.01) |
| *H01M 10/052* | (2010.01) |

(52) U.S. Cl.
CPC ..... *H01M 10/0562* (2013.01); *H01M 10/052* (2013.01); *H01M 2300/0068* (2013.01); *H01M 2300/0071* (2013.01)

(58) Field of Classification Search
CPC . H01M 2300/0071; H01M 2300/0068; H01M 10/0562
See application file for complete search history.

(56) References Cited

U.S. PATENT DOCUMENTS

| | | | | |
|---|---|---|---|---|
| 11,942,596 | B2 * | 3/2024 | Takano | ............... H01M 10/052 |
| 2011/0177397 | A1 | 7/2011 | Ogasa | |
| 2012/0094214 | A1 | 4/2012 | Zahid | |
| 2016/0181657 | A1 * | 6/2016 | Kawaji | ............. H01M 10/0525 |
| | | | | 429/162 |
| 2016/0293988 | A1 | 10/2016 | Sakamoto | |
| 2016/0329598 | A1 | 11/2016 | Schneider | |
| 2017/0179472 | A1 | 6/2017 | Allie | |

(Continued)

FOREIGN PATENT DOCUMENTS

| | | |
|---|---|---|
| CN | 108604665 | 9/2018 |
| CN | 109037759 | 12/2018 |

(Continued)

OTHER PUBLICATIONS

ISO 13320-1, "Particle size analysis—Laser diffraction methods", Second Edition, Jan. 2020, 66 pages.

(Continued)

*Primary Examiner* — Basia A Ridley
*Assistant Examiner* — Jonathan William Estes
(74) *Attorney, Agent, or Firm* — Ruggiero McAllister & McMahon LLC

(57) ABSTRACT

A sintering aid mixture for sintering solid-state ion conductors, electrode materials, or the like for solid-state batteries is provided. The mixture includes at least one sol-gel precursor and/or at least one sol-gel direct precursor produced from at least one sol-gel precursor.

10 Claims, 3 Drawing Sheets

(56) References Cited

U.S. PATENT DOCUMENTS

| | | | |
|---|---|---|---|
| 2017/0288263 A1 | 10/2017 | Ma | |
| 2018/0175446 A1 | 6/2018 | Nishizaki | |
| 2018/0212246 A1* | 7/2018 | Kawakami | H01M 4/62 |
| 2018/0375150 A1* | 12/2018 | Yamamoto | G04C 10/00 |
| 2020/0106131 A1* | 4/2020 | Takano | H01M 50/434 |
| 2020/0381774 A1* | 12/2020 | Ueno | H01M 50/172 |
| 2021/0036361 A1* | 2/2021 | Yamakawa | H01M 50/434 |
| 2021/0340011 A1* | 11/2021 | Laine | C03C 1/006 |
| 2022/0271288 A1* | 8/2022 | Burdynska | H01M 50/414 |

FOREIGN PATENT DOCUMENTS

| | | |
|---|---|---|
| CN | 109560248 | 4/2019 |
| CN | 111116198 | 5/2020 |
| DE | 102014012926 | 6/2015 |
| DE | 102014100684 | 5/2017 |
| KR | 20170034581 | 3/2017 |
| RU | 2550206 C1 * | 5/2015 |

OTHER PUBLICATIONS

Jian, "Effects of sintering aids Al2O3 and Y2O3 on the lithium ion conductivity of solid lithium ion electrolyte LLZO", Materials Science and Engineering of Powder Metallurgy, vol. 23 No. 2, Apr. 2018, with English abstract.
Zhang, "Solid Inorganic Chemistry—Solid State Inorganic Chemistry", Wuhan University Press, First Edition, Jan. 2005, ISBN 7-307-04372-6, 4 pages. Machine translation.
Liu, "Nanomaterials and their preparation technology", Beijing, Metallurgical Industry Press, 2014, 3 pages. Machine translation.
Wang, "Solid Oxide Fuel Cell Technology", Wuhan University Press, Oct. 2015, 4 pages. Machine translation.

* cited by examiner

| Sample | $\sigma_{total}$ [$\mu$S cm$^{-1}$] | Relative density [%] |
|---|---|---|
| GK-LLZO | 0,143±0,005 | 87,9 |
| GK-LLZO + 5 wt. % LiAlO$_2$ | 0,41±0,01 | 90,2 |
| SG-LLZO | 0,154±0,008 | 84,4 |
| SG-LLZO + 5 wt. % LiAlO$_2$ | 0,28±0,01 | 87,0 |

FIG. 2

SINTERING AID MIXTURE, SOLID-STATE ION CONDUCTOR, AND METHOD FOR PRODUCING SOLID-STATE ION CONDUCTORS

CROSS REFERENCE TO RELATED APPLICATIONS

This application claims benefit under 35 USC § 119 of German Application 10 2020 209 708.9 filed Jul. 31, 2020, the entire contents of which are incorporated herein by reference.

BACKGROUND

1. Field of the Invention

The invention relates to a sintering aid mixture for sintering solid-state ion conductors, electrode materials, or the like for solid-state batteries. The invention further relates to a solid-state ion conductor. The invention further relates to a method for producing solid-state ion conductors, electrode materials, or the like for solid-state batteries. Moreover, the invention relates to use of a sintering aid mixture for reducing the sintering temperature during sintering of solid-state ion conductors, electrode materials, or the like for solid-state batteries.

2. Description of Related Art

Although applicable to any solid-state batteries, the present invention is explained in regard to lithium solid-state batteries.

Lithium solid-state batteries are based on the conduction of charge carriers in the form of lithium ions by means of a solid-state electrolyte. The lithium ions can be supplied, for example, via oxide-based ceramic materials, such as, for example, lithium-lanthanum-zirconium oxide—LLZO—or lithium-aluminum-titanium phosphate—LATP.

In the production of the lithium solid-state battery, it is known to supply the oxide-based ceramic materials in the form of a powder, which is then transformed into a porous preform (green body) of a later battery component, such as, for example, a separator membrane, a cathode, or the like, by subsequent pressing, slip casting, or tape casting or by another ceramic forming process. At the interfaces between the powder particles that border one another in the green body, a transition resistance arises during ion conduction and diminishes the total conductivity of the battery component produced in this way.

In order to reduce the transition or interface resistances that thereby form and thus to increase once again the total conductivity of the battery component, it has further become known to sinter the preform of the battery component that has been produced by the ceramic forming process. The corresponding sintering process in this case necessitates temperatures above approximately 850° C., in particular when the green body comprises ceramic material. In addition, sintering additives can be added for producing a dense sintered body or, in general, for controlling properties of the sintering process.

Furthermore, in the production of cathodes of lithium solid-state batteries, materials such as, for example, nickel-manganese-cobalt oxide or lithium-manganese-cobalt oxide or also an electron conductor based on a carbon compound are used, such as, for example, one based on conductive soot, graphite, or the like. However, these materials are sensitive to temperature and are damaged by the aforementioned sintering temperatures above approximately 850° C.

A further problem is that, at high sintering temperatures, a vaporization of lithium-containing compounds can occur and can once again lower the conductivity of the battery component. If, in addition, lithium-free sintering additives are used, the mentioned effect arises more strongly.

Known oxide-based sintering additives, such as, for example, oxide-based sintering additives made from inorganic lithium salts, can lower the temperature required for the sintering process, but not to a sufficient extent to prevent damage to the battery component. Oxide-based sintering aids of this kind are known, for example, from US 2011/0177397 A1. Additional sintering aids have become known, for example, from KR 2017/0034581 A or CN 109037759 A.

Furthermore, it has become known to use low-melting sintering additives, such as, for example, fluorides, in order to lower the sintering temperature. However, these additives, of course, have the drawback that they are predominantly not based on oxide. Moreover, the known sintering aids are often readily volatile and undesired gases can be formed during the decomposition. It can then likewise be more difficult to control the sintering process.

SUMMARY

An object of the present invention is, therefore, to provide a sintering aid mixture, a solid-state ion conductor, and a method for producing solid-state ion conductors that provide for the lower temperature required for a sintering process of lithium-based materials, in particular a temperature of less than 1100° C., especially preferred of less than 850° C., and, at the same time, provide a battery component with high conductivity. Another object of the present invention is to provide an alternative sintering aid mixture, an alternative solid-state ion conductor, and an alternative method for producing solid-state ion conductors.

In one embodiment, the present invention accomplishes the aforementioned objects by way of a sintering aid mixture for sintering solid-state ion conductors, electrode materials, or the like for solid-state batteries, comprising at least one sol-gel precursor and/or at least one sol-gel direct precursor that is produced from at least one sol-gel precursor.

In another embodiment, the present invention accomplishes the aforementioned objects by way of a solid-state ion conductor, in particular a lithium ion conductor, comprising a sintering aid mixture according to the present application.

In another embodiment, the present invention accomplishes the aforementioned objects by way of a method for producing solid-state ion conductors, electrode materials, or the like for solid-state batteries, comprising a sintering method with use of a sintering aid mixture according to the present application.

In another embodiment, the present invention accomplishes the aforementioned objects by use of a sintering aid mixture according to the present application for reducing the sintering temperature during sintering of solid-state ion conductors, electrode materials, or the like for solid-state batteries to a temperature that, in comparison to a variant that is free of sintering aids, is lowered by at least 20° C., preferably by at least 50° C., especially preferred by at least 100° C., in particular at a temperature of less than 1100° C., in particular of less than 1000° C., preferably of less than 900° C., in particular of less than 840° C., preferably of less than 800° C.

These temperatures apply especially to LLZO as a solid-state lithium ion conductor material. For LATP, a lowering to markedly lower temperatures of less than 700° C. is to be expected.

One of the advantages thereby achieved is that the temperature required for the sintering process of lithium-based materials can thereby be lowered, and this process can be carried out, in particular, at less than 1100° C., in particular at less than 1000° C., preferably at less than 900° C., in particular at less than 850° C., without the conductivity of the sintered battery component being significantly reduced. A further advantage is that the sintering aid mixture can be prepared in a simple and cost-effective manner. A further advantage thereby achieved is that, by means of the sintering aid mixture, the sintering activity can be increased substantially. In particular, it is thereby possible to use a lower sintering temperature in order to achieve, in comparison to a sintering without the sintering aid mixture, comparable densification and/or, for comparable sintering temperatures, a more intense densification.

In particular, a further advantage of the sintering aid mixture can be that, when a compact is sintered without a sintering aid mixture, the sintering temperature usually used in order to obtain a desired densification of the compact can be lowered by more than 50° C., in particular more than 70° C., preferably more than 100° C., in particular by more than 150° C., preferably by more than 200° C., in particular by more than 300° C., when the sintering aid mixture is added to the compact. The latter then exhibits the desired densification.

In other words, in one embodiment, the present invention provides a sintering aid mixture that, in comparison to a compact sintered without a sintering aid mixture, makes it possible to lower the sintering temperature usually used in order to obtain a desired densification of the compact by more than 50° C., in particular by more than 70° C., preferably by more than 100° C., in particular by more than 150° C., preferably by more than 200° C., in particular by more than 300° C., when the compact has the sintering aid mixture and, at the same time, exhibits the same desired densification.

In particular, a further advantage of the sintering aid mixture can be that, when a compact is sintered without a sintering aid mixture, the sintering temperature usually used in order to obtain a desired densification of the compact can be lowered by more than 5%, in particular by more than 7.5%, preferably by more than 10%, in particular by more than 12.5%, preferably by more than 15%, in particular by more than 20-25%, when the sintering aid mixture is added to the compact. The latter then exhibits the desired densification.

In other words, in one embodiment, the present invention provides a sintering aid mixture that, in comparison with a compact sintered without a sintering aid mixture, makes possible a lowering of the sintering temperature usually used in order to obtain a desired densification of the compact by more than 5%, in particular by more than 7.5%, preferably by more than 10%, in particular by more than 12.5%, preferably by more than 15%, in particular by more than 20-25%, when the compact has the sintering aid mixture, and, at the same time, exhibits the same desired densification.

The term "sintering aid mixture" is to be understood in the broadest sense and refers to one or more aids, auxiliaries, and/or additives for a sintering method. In particular, the sintering aid mixture can also have solely one component.

The term "sol-gel" is to be understood in the broadest sense and refers to a sol-gel process for the production of non-metallic inorganic or hybrid polymeric materials from colloidal dispersions (sols). The term sol-gel is abbreviated in one more locations in the present application as "SG".

The term "sol-gel precursor" is to be understood in the broadest sense and refers to a substance or a mixture of substances that constitutes the starting material for a sol-gel process.

The term "sol-gel direct precursor" is to be understood in the broadest sense and refers to a substance or a mixture of substances that was produced with the use of a sol-gel precursor and consequently refers to a successive substance or mixture of substances produced in the procedure relating to the sol-gel process with use of the sol-gel precursor.

The term "glass-ceramic" is abbreviated in one more locations in the present application as "GK". The term "lithium aluminate" is abbreviated in one more locations in the present application as "LA". The term "lithium-lanthanum-zirconium oxide" is abbreviated in one more locations in the present application as "LLZO".

Further features, advantages, and additional embodiments of the invention are described below or become evident thereby.

In accordance with an advantageous enhancement, the sol-gel direct precursor is present in the form of a powder. Accordingly, the sintering aid mixture can be introduced in a simple way prior to the sintering process of the solid-state ion conductor, electrode materials, or the like.

In accordance with another advantageous enhancement, the sol-gel direct precursor is prepared as a stoichiometric mixture of at least two sol-gel precursors. The advantage of this is that a sol-gel direct precursor is provided in a simple way.

In accordance with another advantageous enhancement, the at least one sol-gel precursor and/or the at least one sol-gel direct precursor produced from at least one sol-gel precursor contain or contains lithium. The advantage of this is that it is thereby possible to reduce not only the temperature for the following sintering process, but also to reduce or prevent the vaporization of lithium from the battery component.

In accordance with another advantageous enhancement, the at least one sol-gel precursor is free of inorganic anions and/or non-oxidic anions. It is thereby possible, for example, to prevent or at least diminish any inclusion of the respective anions in the structure of the battery component and thus to prevent or at least diminish any reduction in the ion conductivity of the battery component.

In accordance with another advantageous enhancement, the at least one sol-gel precursor has at least one organometallic compound, in particular comprising an alkoxide, acetate, or the like, preferably lithium acetate and/or nitrate. The advantage of this is that sol-gel precursors of this kind do not contain any inorganic anions, which exhibit a tendency later to be incorporated in the crystal structure of a solid-state ion conductor that is to be sintered. It is thereby prevented that the functionality thereof is altered in an undesirable way.

In accordance with another advantageous enhancement of the solid-state ion conductor, it comprises lithium-lanthanum-zirconium oxide and/or lithium-aluminum-titanium phosphate. The advantage of this is a high conductivity and a simple preparation of the solid-state ion conductor.

In accordance with another advantageous enhancement, the sintering aid mixture is added to the solid-state ion conductor in a proportion of at most 15 wt %, in particular between 0.01 wt % and 10 wt %, preferably between 1 wt % and 7.5 wt %, in particular between 1 wt % and 5 wt %, preferably between 1 wt % and 4 wt %. The advantage of this is that it is possible not only to lower the sintering temperature in an efficient manner, but also to increase markedly the conductivity of the solid-state ion conductor.

Advantageously, the solid-state conductor according to the invention is increased in terms of its conductivity, in comparison to a sintering-aid-free solid-state ion conductor, by at least the factor 1.5, preferably by at least the factor 2, especially preferred by at least the factor 3. This results in the advantage of an increased total conductivity of the solid-state ion conductor as a result of the addition of a sintering aid mixture according to the invention.

In accordance with another advantageous enhancement of the method, the sintering method is carried out at a temperature of less than 1100° C., in particular of less than 1000° C., preferably of less than 900° C., in particular of less than 840° C., preferably of less than 800° C. It is thereby effectively prevented that any vaporization of charge carrier materials, in particular of lithium ions, ensues during the production of the solid-state ion conductor. In other words, it is possible to effectively prevent any reduction in the ion conductivity of the solid-state ion conductor.

Further important features and advantages of the invention ensue from the dependent claims, from the drawings, and from the associated figure descriptions based on the drawings.

It is understood that the features mentioned previously and the features still to be explained below can be used not only in the respectively given combination, but also in other combinations or alone, without departing from the scope of the present invention.

Preferred implementations and embodiments of the present invention are illustrated in the drawings and are explained in detail in the following description, wherein the same reference numbers refer to identical or similar or functionally identical components or elements.

BRIEF DESCRIPTION OF THE DRAWINGS

FIG. 2 is a table for the total conductivity and the relative density of compacts in accordance with embodiments of the invention.

DETAILED DESCRIPTION

Figure 1A:
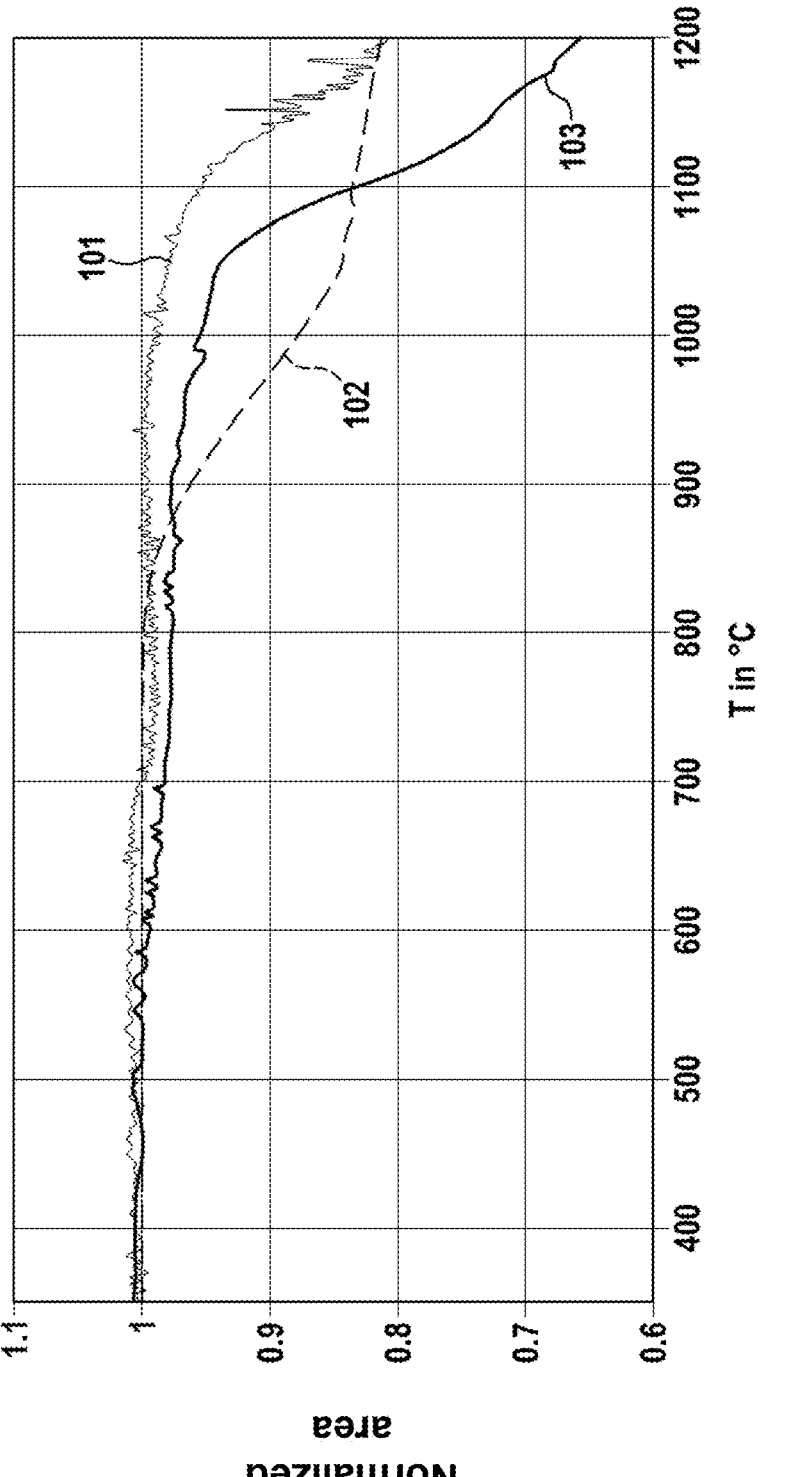
FIGS. 1a and 1b are schematic illustrations of the normalized area of powder compacts in accordance with embodiments of the invention as a function of the temperature.

Preparation of reference samples without addition of a sintering aid mixture in accordance with any embodiment of the present invention.

In the following, the synthesis of the materials GK-LLZO and SG-LLZO as materials will be described first. They will then be pressed to form compacts and the compacts will be sintered.

Synthesis of glass-ceramic LLZO (GK-LLZO). GK-LLZO was synthesized by means of a melting method, such as described, for example, in DE 10 2014 100 684 B4, which is incorporated herein by reference. In this case, the oxides of the metal cations were fused together and homogenized in a skull crucible. In this case, the skull crucible consisted of vertical metal tubes, which were cooled with water. The educts were combined in the crucible and the batch was preheated using a burner in order to achieve a sufficient conductivity. Further heating was carried out by irradiation with high-frequency energy via an induction coil. Formed on the cooled metal tubes was a layer of solidified melt, which separated the crucible wall from the liquid melt. It was possible in this way to prevent any possible reaction between the crucible material and the melt. The mix was homogenized by means of a water-cooled stirrer. After the reaction had ended, the heating was switched off and the melt solidified in the crucible in the form of a solid block.

The solid block was first broken apart using a hammer and chisel to form smaller fragments. These were then fed in one or more throughputs to a jaw crusher until fragments with a size of at most 10 mm in the longest extension were formed. They, in turn, were ground on a disk mill to a size of $d_{99}<1$ mm.

1 kg of coarsely ground GK-LLZO powder with a grain size of <1 mm is fed to a counterjet mill. A connecting sieve provides a powder fraction that—after a further separation of fine fractions in a cyclone—has a particle size distribution of $d_{50}=1.4$ μm, $d_{99}=2.9$ μm, and $d_{99}=4.1$ μm. The measurement of particle sizes is made with the use of the statistical light scattering method in accordance with the standard ISO 13320-1 on a CILAS Model 1064 particle size measuring instrument. The measurement is carried out in water as medium and analyzed by the Fraunhofer method.

Synthesis of ceramic LLZO, produced via the sol-gel route (SG-LLZO). The synthesis of SG-LLZO as a reference material relative to the powders that were prepared via a glass-ceramic route was carried out via a sol-gel variant. For this purpose, a zirconium oxide direct precursor powder (Zr-VP) was produced first.

For the production of the Zr-VP, zirconium propoxide solution (70% in 1-propanol) (234.04 g, 0.5 mol, 1.0 eq.) was placed in a round-bottom flask. Via a dropping funnel, acetyl acetone (50.08 g, 0.5 mol, 1.0 eq.) was added under strong stirring and, after the addition had ended, the resulting yellowish solution was stirred for one hour at room temperature. The solution was treated dropwise with water (23.78 g, 1.32 mol, 2.6 eq.) under constant stirring, and, after the addition had ended, stirring was continued for a further 30 minutes. The addition of water caused the solution to turn deep orange and to become more viscous.

The solution was freed of solvent rapidly on a rotary evaporator, whereby an orange-yellow powder was obtained. The powder was kept in a crystallization dish for 5 hours at 125° C. in the oven in order to remove all residues of solvent.

For the production of SG-LLZO, lanthanum (III) acetate sesquihydrate (30.75 g, 0.09 mol, 1 eq.) in approximately 130 mL of ethanol was placed in a round-bottom flask and treated dropwise with 2-(2-methoxyethoxy) acetate, so that a milky, cloudy solution formed. Zr-VP (12.68 g, 0.06 mol, 0.67 equivalent concentration eq.) was dissolved in 60 mL of ethanol and added to the lanthanum (III) acetate solution while stirring. Lithium acetate dihydrate (23.58 g, 0.23 mol, 2.57 eq.) and aluminum chloride hexahydrate (1.74 g, 0.007 mol, 0.08 eq.) were added to the solution, and the orange cloudy solution was stirred overnight at room temperature. It was freed of the solvent by means of a rotary evaporator and the resulting yellowish orange powder was calcined in a $ZrO_2$ crucible at a heating rate of 10 K/min for 7 hours at 1000° C. The resulting colorless powder was ground using a mortar and pestle under nitrogen atmosphere and then ground using a planetary mill.

Production of the compacts. In order to determine the conductivity of GK-LLZO and SG-LLZO with and without a sintering aid and in order to carry out contacting tests with lithium, compacts of the various powders were produced. For this purpose, a green body was first prepared in air. Approximately 0.3-0.5 g of the powder was transferred to a cylindrical steel press die and the steel stamp was pressed in place in a handtight manner. Subsequently, the powder was pressed uniaxially with a defined force (30 kN) for two minutes and afterwards sintered at 1200° C.

For further tests and measurements, the surface of the compacts was polished in an argon glovebox (MBraun, $H_2O$<1 ppm, $O_2$<1 ppm) using silicon carbide sandpaper. The thickness of the compacts after polishing was approximately 1 mm.

Contacting of the compacts with a gold layer. For the sample preparation, the compacts were produced as described above, and, after being polished, were sputtered with a thin gold layer (~130 nm) for four minutes and at a current intensity of 60 mA by using an instrument of the Leica company. The installation of the compacts in a suitable measuring cell was carried out in an argon glovebox.

The impedance of the compact was measured on a broadband dielectric spectrometer using a Novocontrol Alpha-A High Performance Frequency Analyzer with cryostats. The frequency range of the measurement was between 4 MHz and 10 MHz, with an AC voltage amplitude of 20 mV being applied.

The measurement data was analyzed using the software ZView 2.9 (Scribner Associates, Inc. USA).

Exemplary embodiments for the production of samples with addition of a sintering aid mixture in accordance with one embodiment of the present invention. The following now presents, by way of the example of a sol-gel direct precursor of lithium aluminate ($LiAlO_2$) as a sintering aid, how the sintering temperature required for the sintering of GK-LLZO and SG-LLZO is reduced, and also shows the dependency of the conductivity on the quantity of the added sintering aid.

Synthesis of a lithium aluminate ($LiAlO_2$) sol-gel direct precursor. Aluminum isopropoxide (21.20 g, 0.10 mol, 1.0 eq.)—used here as a sol-gel precursor for $Al_2O_3$—was dispersed in 67 mL of ethyl acetate and treated while stirring with 40 mL of acetic acid (41 g, 0.68 mol, 6.8 eq.). A milky white suspension was thereby obtained. Lithium acetate dihydrate (23.58 g, 0.23 mol, 2.57 eq.)—used here as a sol-gel precursor for $Li_2O$—was dissolved in 57 mL of ethanol and added to the suspension while stirring. Stirring was continued for one hour at room temperature. The suspension was evaporated and the gel was dried for approximately 20 hours at 100° C. The obtained colorless powder was finely ground using a mortar and pestle. A colorless powder was obtained as lithium aluminate ($LiAlO_2$) sol-gel direct precursor.

Lithium aluminate ($LiAlO_2$) sol-gel direct precursor as a sintering aid mixture. In order to investigate the effect of a sintering additive or a sintering aid mixture, a sol-gel direct precursor of lithium aluminate ($LiAlO_2$), LA, was produced via a sol-gel route and was combined, in each case in a proportion of 15 wt %, with GK-LLZO and SG-LLZO. Subsequently, the powder mixture was pressed to form a pellet analogous to the reference samples, sintered, and investigated electrochemically.

Figure 1B:
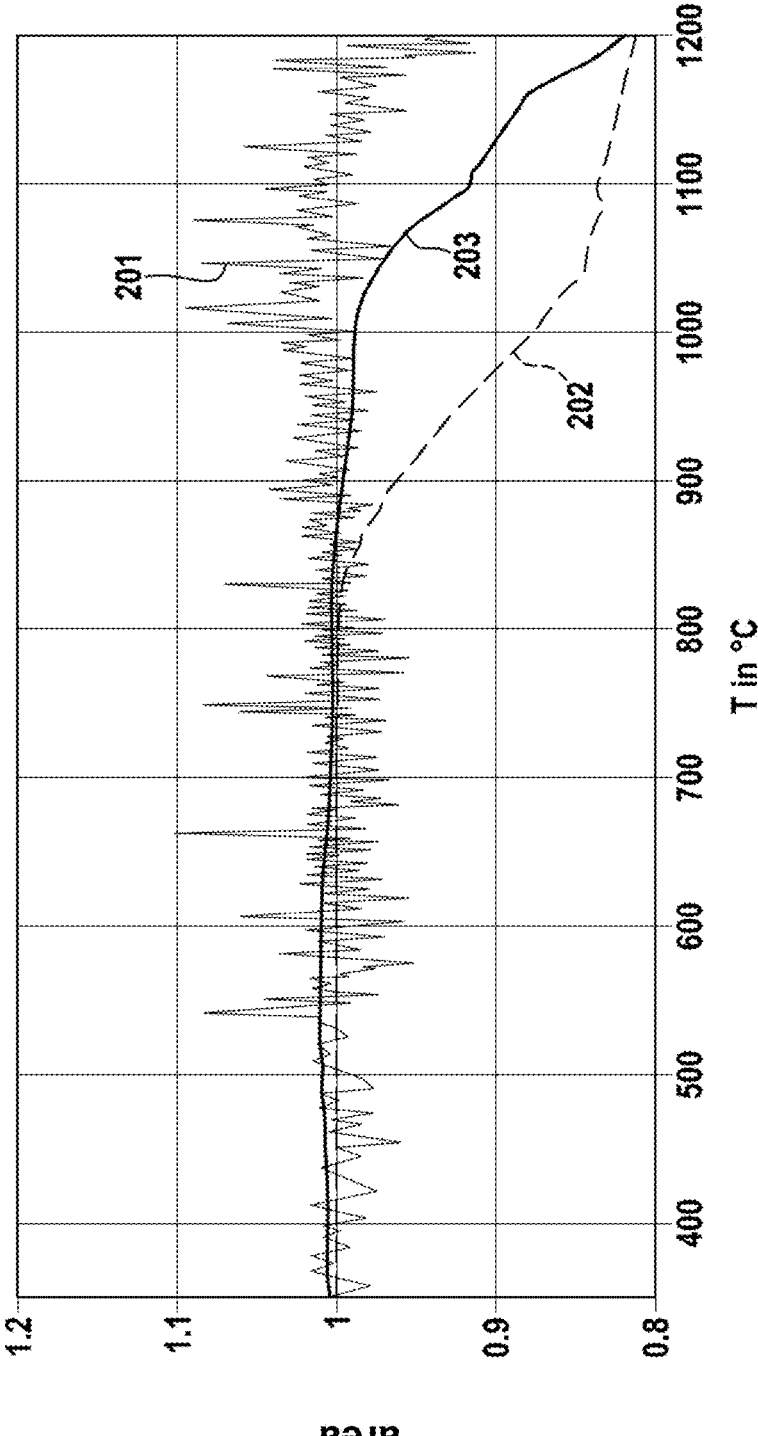

Characterization of samples in accordance with an embodiment of the present invention (that is, samples produced by addition of a sintering aid mixture and reference samples produced without addition of sintering additives in comparison). For a first phenomenological characterization of the sintering behavior, the $LiAlO_2$ sol-gel direct precursor and the mixtures of GK-LLZO and the $LiAlO_2$ sol-gel direct precursor and SG-LLZO and the $LiAlO_2$ sol-gel direct precursor were each investigated in the hot-stage microscope (see FIG. 1). In detail, FIG. 1a shows the plot of the normalized area of the powder compact of the $LiAlO_2$-sol-gel direct precursor (reference number 102), GK-LLZO (reference number 101), and GK-LLZO+15 wt % $LiAlO_2$ sol-gel direct precursor (reference number 103) versus temperature and FIG. 1b shows the plot of the normalized area of the powder compact of the $LiAlO_2$ sol-gel direct precursor (reference number 202), SG-LLZO (reference number 201), and SG-LLZO+15 wt % $LiAlO_2$ sol-gel direct precursor (reference number 203) versus temperature. The thermocouple present in the measuring apparatus measures in a reliable manner only starting at a temperature >350° C., for which reason the illustration in FIGS. 1a and 1b begins only starting from this temperature.

For the $LiAlO_2$ sol-gel direct precursor 102, 202, the shrinkage begins at approximately 810° C. slowly and becomes increasingly stronger until, starting at a temperature of 900° C., a linear decrease in the normalized area down to 85% of the original area takes place. Starting at 1020° C., the shrinkage reduces to approximately 82% up to the end of the measurement (1200° C.).

From the comparison of the hot-stage microscope (EHM) curves of GK-LLZO 101 and GK-LLZO+15 wt % $LiAlO_2$ sol-gel direct precursor 103, the positive effect of the sintering aid mixture $LiAlO_2$ sol-gel direct precursor 102 in regard to the decrease in the normalized sample area can readily be seen. Starting at approximately 550° C., a first minimal shrinkage appears, which, in the case of GK-LLZO 101, is evident only at 700° C. In the further course of 101, starting at 950° C., a stronger reduction in the area occurs, and, starting at a temperature of 1050° C., the curve transitions into a very steep course, so that the sample area shrinks by nearly 30% (1150° C.). The densification increases further with increasing temperature, but less strongly, to a normalized sample area of approximately 65%. For the mixture of SG-LLZO and the $LiAlO_2$ sol-gel direct precursor (15 wt %) 103, there also results in the EHM a marked difference in comparison to the pure LLZO powder 101. The shrinkage begins here slightly even at 880° C., and the curve 103 transitions, starting at approximately 1050° C., to a steeper course until the minimal normalized area in the course of the curve (approximately 82%) is reached.

On the basis of the EHM data, consequently, the effect of the $LiAlO_2$ sol-gel direct precursor 102 as a sintering aid mixture is evident: For both powders GK-LLZO and SG-LLZO, a sintering occurs first at lower temperatures and the densification of the samples is markedly greater.

In addition to the phenomenological EHM investigations, $LiAlO_2$ was also combined with GK-LLZO and SG-LLZO (two mixtures, each with 5 wt % $LiAlO_2$ sol-gel direct precursor) and sintered. In a purely visual manner, the effect of $LiAlO_2$ sol-gel direct precursor as a sintering additive could be confirmed. The compacts produced appear overall more homogeneous and more stable. Presented in FIG. 2, in addition to the relative density of the compacts, are also the conductivities of the pure LLZO variants, that is, GK-LLZO and SG-LLZO, and the conductivities of the LLZO-$LiAlO_2$ mixtures, each with 5 wt % $LiAlO_2$ sol-gel direct precursor.

Even for a small addition of 5 wt % $LiAlO_2$ sol-gel direct precursor as a sintering aid mixture, better conductivities were obtained in both cases than in the case of the pure LLZO variants (see FIG. 2).

Through the electrochemical characterization and the subsequent phase analysis by means of powder diffractometry of the compacts with subsequently added sintering additive ($LiAlO_2$ sol-gel direct precursor), it was possible to ascertain that, for addition of a sintering aid mixture according to the invention as a sintering additive, the conductivity can be or is positively influenced.

In summary, at least one of the embodiments of the invention can provide at least one of the following advantages and/or features: Simply produced sintering aid; Reduction of the sintering temperature by addition of the sintering aid; Cost-effective sintering aid; Prevention of a reduction of the conductivity, in particular in the case of lithium-based materials; and Simpler production of solid-state batteries.

Although the present invention was described on the basis of preferred exemplary embodiments, it is not limited to these, but can be modified in a variety of ways.

LIST OF REFERENCE NUMBERS

102 plot of LA sol-gel direct precursor
101 plot of GK-LLZO
103 plot of GK-LLZO+LA sol-gel direct precursor
202 plot of LA sol-gel direct precursor
201 plot of SG-LLZO
203 plot of SG-LLZO+LA sol-gel direct precursor

What is claimed is:

1. A sintering aid mixture comprising a sintering precursor selected from a group consisting of a sol-gel precursor, a sol-gel direct precursor prepared from the sol-gel precursor, and any combinations thereof to provide a sol-gel preliminary product and/or a sol-gel, wherein the sol-gel precursor comprises at least one organometallic compound selected from the group consisting of an alkoxide, an acetate, and any combination thereof, and a compact including at most 15% of the sintering aid mixture that when compacted achieves a densification at a sintering temperature at least 5% lower than the same compaction without the sintering aid mixture and has a conductivity increase of a factor of at least 1.5 as compared to the same compaction without the sintering aid mixture.

2. The sintering aid mixture of claim 1, wherein the sintering aid mixture is adapted for a use selected from a group consisting of a use for a solid-state ion conductor, a use for an electrode material, and a use for a solid-state battery component.

3. The sintering aid mixture of claim 1, wherein the sol-gel direct precursor is a powder.

4. The sintering aid mixture of claim 3, wherein the sol-gel direct precursor is a stoichiometric mixture of at least two sol-gel precursors.

5. The sintering aid mixture of claim 1, wherein the sintering precursor comprises lithium.

6. The sintering aid mixture of claim 1, wherein the sol-gel precursor is free of non-oxidic anions.

7. The sintering aid mixture of claim 6, wherein the sol-gel precursor comprises lithium acetate.

8. The sintering aid mixture of claim 7, wherein the sol-gel precursor further comprises a nitrate.

9. The sintering aid mixture of claim 1, wherein the sintering precursor has a sintering temperature selected from a group consisting of less than 1100° C., less than 1000° C., less than 900° C., less than 850° C., less than 840° C., less than 800° C., and less than 700° C.

10. The sintering aid mixture according to claim 1, wherein the sol-gel precursor comprises a lithium and aluminum-containing organometallic compound.

* * * * *